United States Patent [19]
Hise

[11] Patent Number: 5,976,043
[45] Date of Patent: Nov. 2, 1999

[54] APPARATUS FOR INCREASING WEAR LIFE OF MACHINE MEMBERS

[76] Inventor: Neil R. Hise, P.O. Box 92500, Albuquerque, N. Mex. 87199

[21] Appl. No.: 08/912,551

[22] Filed: Aug. 18, 1997

[51] Int. Cl.[6] .................. F16H 7/00; F16H 7/24; F16H 7/20; B02C 1/10

[52] U.S. Cl. .................. 474/88; 474/150; 474/198; 241/40; 241/275

[58] Field of Search .................. 474/84, 85, 88, 474/148, 150, 170, 198; 241/274, 275, 40

[56] References Cited

U.S. PATENT DOCUMENTS

| | | |
|---|---|---|
| 301,380 | 7/1884 | Maltby . |
| 2,548,316 | 4/1951 | Locke .................................. 474/85 |
| 2,664,758 | 1/1954 | Smits . |
| 3,955,767 | 5/1976 | Hise .................................. 241/275 |
| 4,090,348 | 5/1978 | Devittorio .................................. 474/88 |
| 4,666,090 | 5/1987 | Ripani et al. .................................. 474/88 |
| 4,832,663 | 5/1989 | Howard, Jr. . |
| 5,374,222 | 12/1994 | Hoffman et al. .................................. 474/150 |
| 5,415,592 | 5/1995 | Hoyt .................................. 474/85 |
| 5,649,844 | 7/1997 | Caricof et al. .................................. 474/88 |
| 5,683,320 | 11/1997 | Friesen et al. .................................. 474/150 |
| 5,694,795 | 12/1997 | Knopp .................................. 474/85 |
| 5,730,672 | 3/1998 | Lin .................................. 474/88 |

*Primary Examiner*—Lenard A. Footland
*Assistant Examiner*—Matthew A. Kaness
*Attorney, Agent, or Firm*—Ray R. Regan

[57] ABSTRACT

An apparatus for increasing wear life of machine members includes a shaft assembly mounted on the machine. Also included are two or more power sources eccentrically aligned in relationship to the shaft assembly of the machine to form an acute angle between the shaft assembly and the two or more power sources. One or more pulleys is attached to the driven shaft which is included in the shaft assembly. One or more drums is attached to each of the drive shafts of each of the engines, and belts are mounted on the drums and pulleys to rotate the driven shaft of the machine.

13 Claims, 4 Drawing Sheets

APPARATUS FOR INCREASING WEAR LIFE OF MACHINE MEMBERS

CROSS-REFERENCE TO RELATED APPLICATION

None

FEDERALLY SPONSORED RESEARCH AND DEVELOPMENT

None

FIELD OF THE INVENTION

The present invention pertains generally to the field of increasing wear life of machine members which are subjected during operation to significant rotational and vibrational stresses. More particularly, the present invention pertains to an apparatus which dampens and reduces rotational and vibrational stress on machine members. The present invention is particularly, but not exclusively, useful for increasing the wear life of bearings and shaft assemblies associated with impact crusher machines.

BACKGROUND OF THE INVENTION

Gravity, friction, velocity of rotation, and load forces applied during operation to bearings, drive shafts, driven shafts, rotors, and other components of driving and driven machines (collectively, "machine members") contribute to wear, fatigue and degradation of machine members. High speed circular rotation of shafts mounted in bearings gives rise to centripetal force, a force which is reacted to by centrifugal reaction. Angular velocity and angular acceleration of machine members subjected not only to high velocity but significant loads may also induce gyroscopic effects on machine members turning or rotating rapidly. Machine members also may be subjected to significant loads about the geometric and rotational axes of a machine member. As is commonly known, when two forces act on a shaft, pin, axle or similar rod or assembly (collectively, "shaft"), a torque is formed whose vector along an x-axis may produce a rotation about the y-axis known as precession. Such rotation may generate significant angular velocities. The gyroscopic effect and the torque may individually and collectively contribute to inducing rapid wear of shafts and bearings in which shafts are mounted. In any rotating or reciprocating machine in which angular accelerations and velocities are present, unbalanced forces may lead to high stresses and vibrations. Further, if the speed of a shaft or rotor is slowly increased from rest, a speed may be achieved at which a deflection increases suddenly, a phenomenon known as "whirling." A shaft which is balanced will rotate around the center of gravity or axis of rotation of a shaft. However, if the shaft rotates at an angular velocity, the shaft may deflect a distance from the center of gravity or axis of rotation due to centripetal reaction. Rotation also may induce undamped free vibrations. All of these forces and phenomena, and others, may contribute to rapid and excessive wear among machine members, particularly in machine members subjected to high loads and forces. This is particularly true, but not exclusively, in machine members associated with impact crushers. Excessive and rapid degradation and wear of machine members in crushers may cause significant down time, expensive delays in repair and replacement of machine members, and delays in use of the crushers while one or more worn machine member is identified, inspected, removed and replaced. Frequent replacement of machine members causes significant expense to the operator. Such delays, costs and expenses are compounded if the apparatus, such as an impact crusher, is located at a remote site.

For example, a wide variety of impact crushers are used in commerce to reduce the size of large earth materials to smaller sized and shaped aggregate. The construction industry trades employ a variety of impact crushers to reduce large aggregate to aggregate sizes and shapes required to satisfy construction specification for mixtures and admixtures of aggregate with cement and other ingredients, and for further processing of size reductions, chemical leaching, and other stages of use. Construction industry use of impact crushers is but one example of the need to reduce wear on machine members.

Generally, impact rock crushers provide a component for introducing aggregate into a device or devices for crushing the aggregate. Most impact crushers are designed to rely on centrifugal force to disperse large aggregate through the crusher, and to impact the larger aggregate against a variety of impact crusher components to break up, reduce in size, and ultimately eject from the crusher an aggregate composed of desired shapes, sizes and consistencies. Intense efforts have been made to achieve improvements in the design and construction of components of impact crushers to reduce the cost of acquiring and operating crushers, to enhance wear resistance of the component parts of crushers, and to facilitate rapid replacement of worn parts of crushers to enable the user of crushers to lose the least possible amount of time during which a crusher is inoperative due to worn parts.

Such improvements are exemplified by those shown in U.S. Pat. No. 3,955,767 issued May 11, 1976 to Mason R. Hise, and U.S. Pat. No. 4,690,341 issued Sep. 1, 1987 to Mason R. Hise and Neil R. Hise, the latter being the inventor of the present invention (collectively, the "Hise Patents"). The Hise patents are instructive on the number and variety of components which may be included in an impact crusher and consequently exposed to wear during operation of an impact crusher. Due to significant loads and stresses placed on many components of impact crushers during operation, friction, fracture, impact, pulsation, angular velocity, and angular acceleration of rotating shafts, may cause driven shafts and bearings to wear rapidly. An impeller of an impact crusher is known to rotate at speeds from about 500 to about 2000 revolutions per minute. The rotation of an impeller, in combination with centrifugal force, creates a material flow of aggregate.

As a result of persistent use of an impact crusher, and the high forces applied to machine members during operation of an impact crusher, replacement of machine members causes down time to repair, refit, and replace machine members. Additional expenses are associated with replacing worn machine member, inventorying replacement components, and delivering a replacement machine members to what is often a remote site, to say little of the general frustration associated with having to stop the aggregate crushing process to replace worn machine members.

What is needed, therefore, is an apparatus for increasing the wear life of machine members during operation of a machine. Particularly what is needed is an apparatus for reducing wear of shafts and bearings associated with impact crushers.

In light of the above, it is an object of the present invention to provide an apparatus for increasing the wear life of machine members, particularly machine members exposed to considerable rotational and vibrational loads and forces.

Another object of the present invention is to provide an apparatus for increasing the wear life of machine members, particularly those members of a machine comprising bearings in which a driven shaft rotates, including a shaft which rotates in a bearing at high velocities and accelerations.

Yet another object of the present invention is to provide an apparatus for increasing the wear life of machine members, including bearings in machines requiring one or more of the bearings to be adjusted loosely in relation to the shaft or shaft assembly, rather than tightly on the driven or rotating shaft of the machine, thus increasing unbalanced radial loads on the bearing or bearings.

Still another object of the present invention is to provide an apparatus for increasing wear life of machine members by reducing or dampening excessive vibrations in an apparatus in which two or more driving machines may be used to rotate a shaft or shaft assembly, thus increasing unbalanced harmonics in the machine members of a driven shaft or shaft assembly.

Still another object of the present invention is to provide an apparatus for increasing the wear life of machine members while also permitting the user to increase the rotational speed of a driven shaft, and apply greater loads to the machine.

Another object of the present invention is to provide an apparatus for increasing the wear life of machine members by relieving pressures and forces on both driven shafts and bearings supporting the driven shafts.

Yet another object of the present invention is to provide an apparatus for increasing wear life of machine members, and a process for manufacturing an apparatus for increasing the wear life of machine members, which respectively are easy to use and to practice, and which are cost effective for their intended purposes.

These and other objects, features, and advantages of such an apparatus for increasing the wear life of machine members will become apparent to those skilled in the art when read in conjunction with the accompanying following detailed description, drawing figures, and appended claims.

SUMMARY OF THE INVENTION

An apparatus for increasing wear life of machine members according to the present invention includes a shaft assembly mounted on the machine. The machine may include, but is not limited to, an impact crusher. The construction industry trades employ a wide variety of impact crushers to reduce large aggregate to aggregate sizes and shapes required to satisfy construction specifications for mixtures and admixtures of aggregate with cement and other ingredients, and for further processing of size reductions, chemical leaching, and other stages of use. One embodiment of a rock impact crusher includes a cylindrical housing. The cylindrical housing contains an impeller assembly comprising an impeller table, impeller plates attached to the table, and impeller brackets for holding impeller shoes. The impeller table is rotatable within the cylindrical housing. The shaft assembly mounted on the machine is engagable with the impeller table and rotates the impeller table within the cylindrical housing. In combination with shoes, the rotating impeller table hurls aggregate outward by centrifugal force against machine components mounted on the internal wall of the cylindrical housing, often known as anvils, to break aggregate into smaller pieces of desired size.

The shaft assembly mounted on said machine according to the present invention includes a driven shaft. In the case of an impact crusher, it is the driven shaft which cooperates with other structural components to rotate the impeller table.

According to the present invention, the shaft assembly of the apparatus for increasing wear life of machine members also includes one or more bearings. Each of the one or more bearings is engagable substantially radially with the driven shaft. In the embodiment of the present invention for an impact crusher, each bearing has an inner race of roller bearings arrayed substantially concentrically to the center of gravity or axis of rotation of the driven shaft. As used in conjunction with an impact crusher, a first bearing ("upper bearing") is located a distance above a second bearing ("lower bearing"). Each bearing is engagable with the driven shaft. However, for purposes of an impact crusher, the upper bearing may be more tightly engagable with the driven shaft than the lower bearing. Because many embodiments of impact crushers require the upper bearing to be more tightly engaged with the driven shaft than the lower bearing, comparatively more friction, heat, and unbalanced forces are generated during rotation of the driven shaft within the lower bearing. Further, the radial load on the lower bearing is greater than on the upper bearing. During rotation, several forces and loads are applied to or generated by rotation of a driven shaft in the lower bearing that is more loosely engaged with the driven shaft than its associated bearing.

An apparatus for increasing the wear life of machine members, according to the present invention, also includes one or more pulleys attached to the driven shaft of the shaft assembly. The one or more pulleys are attached substantially concentrically to the driven shaft. The one or more pulleys may be formed with one or more grooves or notches for receiving one or more belts for engaging and being rotated by a drive shaft assembly on a driving power source.

According to the present invention, an apparatus for increasing wear life of machine members also includes two or more power sources. In the embodiment of the present invention used with impact crushers, the power sources are engines. As will be obvious to one skilled in the art, the engines may be fueled or powered by electricity, gasoline, diesel or similar fuels. Each of the one or more engines is equipped with a drive shaft.

An apparatus for increasing wear life of machine members contemplates a unique and novel arrangement of the driven shaft in relationship to the drive shaft of each of the two or more engines. Rather than adhere to conventional wisdom or uncritical thought processes of symmetry, which results in aligning each engine on opposite sides of a driven shaft, the present invention aligns the two or more engines eccentrically. The term "eccentrically" or "eccentric" means that the axis of rotation of the driven shaft, and the axes of rotation of the driving shaft on the two or more power sources, are not aligned substantially in a straight line. Thus, the present invention aligns the two or more engines with relation to the axis of rotation of the driven shaft of the shaft assembly to form an acute angle between the axis of rotation of the driven shaft, and the longitudinal axis of each of the drive shafts of the two or more engines. The arrangement of the two or more engines and of the driven shaft to form a relational triangle having for one apex the center of the axis of rotation of the driven shaft, and the centers of the axes of rotation of the two or more power sources as the apeces of the triangle substantially reduces the forces and loads which cause wear to machine members including the one or more bearings in which the driven shaft is located. The results of aligning the two or more engines eccentrically to the driven shaft of a machine materially increases the radial loads and forces that a bearing will endure. The eccentric alignment of the two or more engines also minimizes vibrations which otherwise are induced in the driven shaft and transmitted to the bearings when two or more engines are located substantially directly opposite one another with a driven shaft positioned substantially between the two or more engines. Such conventional alignment of such two or more engines increases unbalanced harmonics. The present invention reduces unbalanced harmonics. In addition, the eccentric alignment of the two or more engines also allows the machine to be driven at higher speeds and sustain higher loads. The acute angle found to be optimum is between 17 degrees and 69 degrees. In addition to applying power evenly on machine members, the configuration of the present invention permits substantially increased torque on work performing machinery. Further, the configuration of the present invention modulates or dampens vibrations as well as induced oscillations on the driven shaft, and consequently increases significantly the life of a bearing in which the driven shaft is sleeved.

The apparatus for increasing wear life of machine members also includes one or more drums attached substantially concentrically to each of the drive shafts of each of the two or more engines. The drums are formed with grooves or slots to enable one or more belts to be drivingly connectable to each drum and to each pulley.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Figure 1:
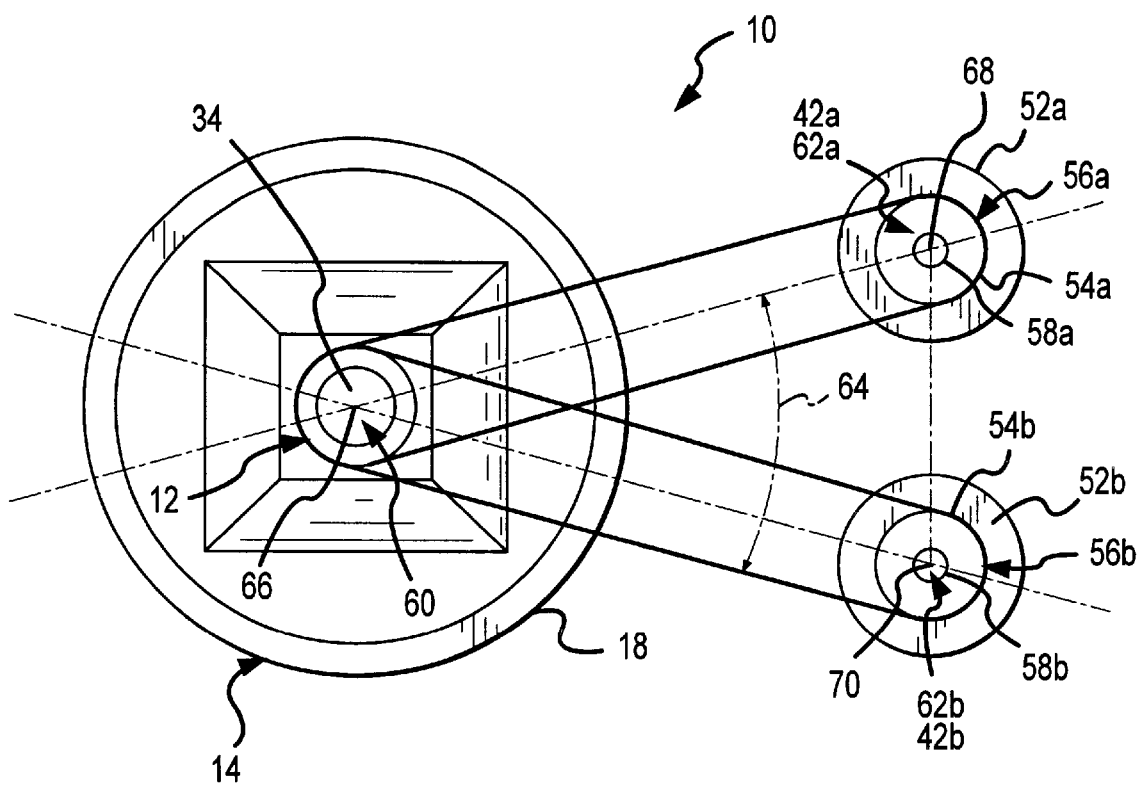
FIG. 1 is a top plan view of an apparatus for increasing wear life of machine members.
Figure 2:
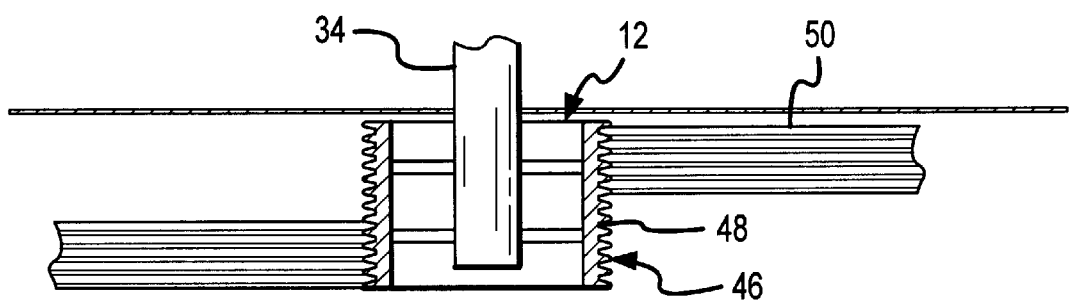
FIG. 2 is a side partial cut-away view of a portion of the apparatus showing the driven shaft.

Referring initially to FIG. 1, an apparatus for increasing wear life of machine members is shown in generally designated 10. As best shown by cross-reference between FIGS. 1 and 2, an apparatus for increasing wear life of machine members 10 according to the present invention includes a shaft assembly 12 mounted on a machine 14. Machine 14 may include, but is not limited to, an impact crusher 16 as shown by cross-reference among FIGS. 3, 4, and 5. Impact crusher 16 includes a cylindrical housing 18. As shown most clearly in FIG. 4, cylindrical housing 18 contains an impeller assembly 20 comprising an impeller table 22, one or more impeller plates 24 attached to table 22, and impeller brackets 26 for holding impeller shoes 28. Impeller table 22 is rotatable within cylindrical housing 18. Shaft assembly 12 mounted within cylindrical housing 18 on impact crusher 16 is shown by cross-reference between FIGS. 3 and 4 as being engagable with impeller table 22. Shaft assembly 12 rotates impeller table 22 within cylindrical housing 18. In combination with shoes 28, rotating impeller table 22 hurls aggregate (not shown) outward by centrifugal force against devices mounted on the internal wall 30 of cylindrical housing 18, often known as anvils 32, to break aggregate into smaller pieces of desired size.

Figure 3:
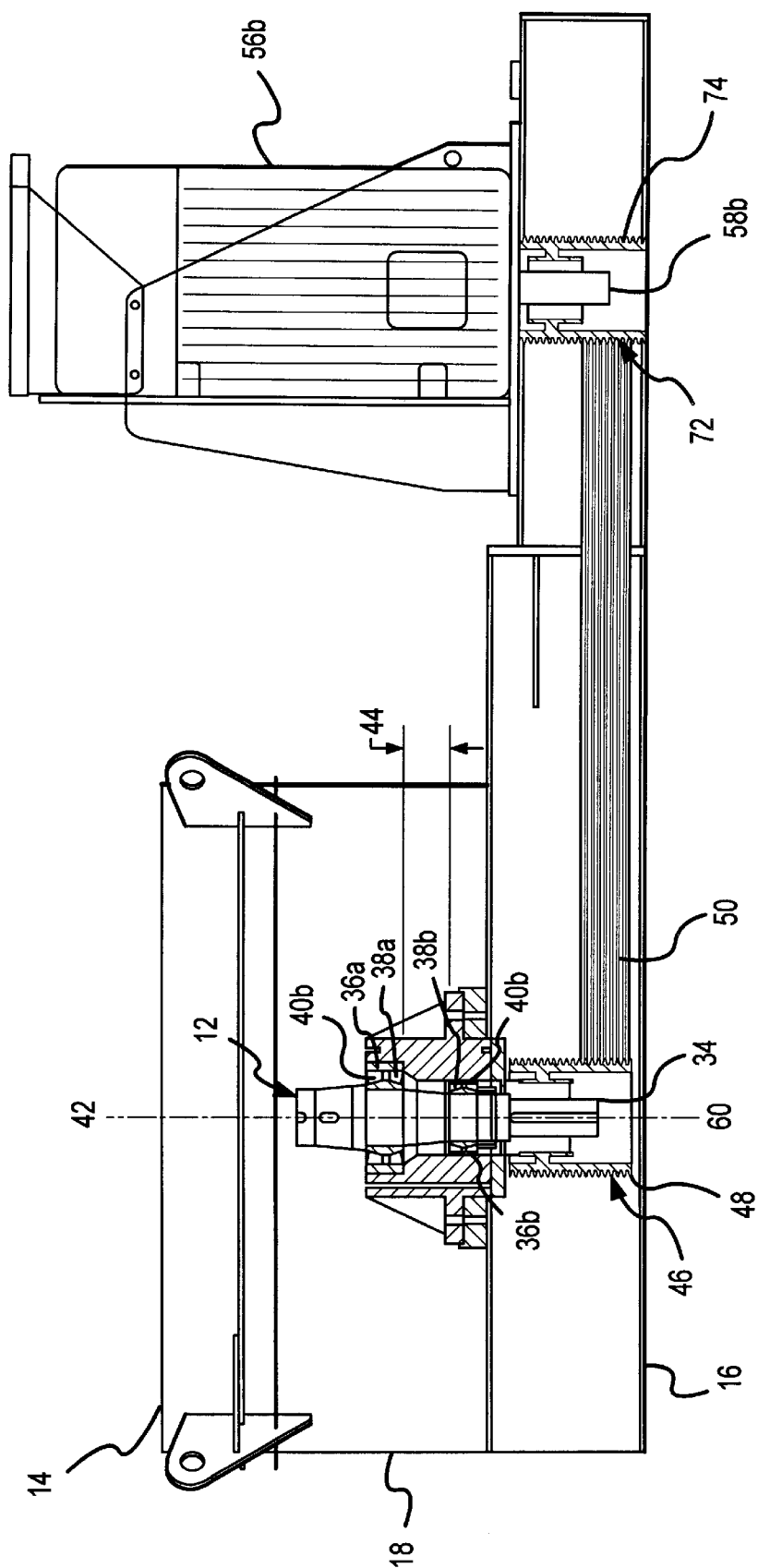
FIG. 3 is a partial side view of the driven shaft assembly and one of the two or more power sources.
Figure 5:
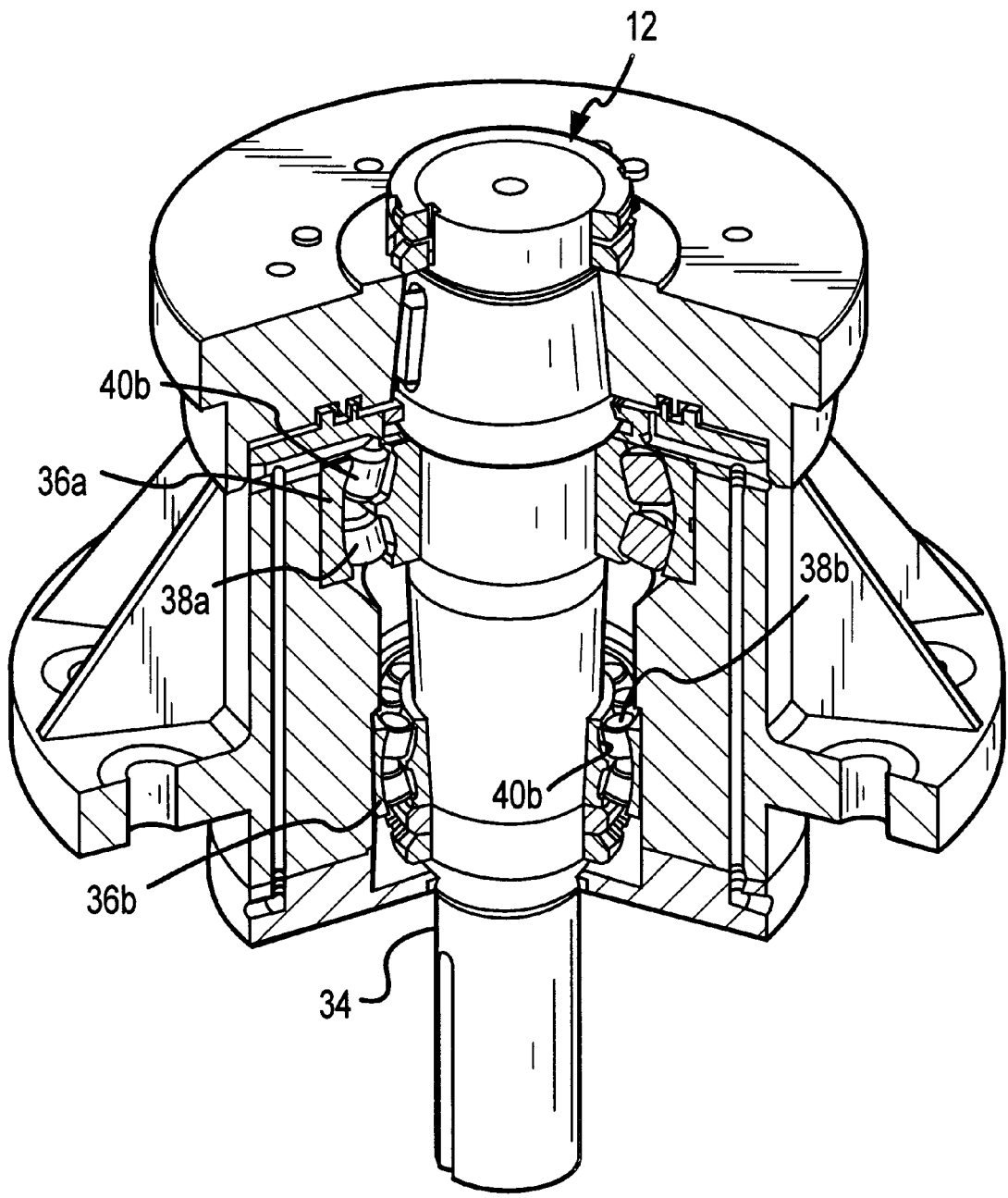
FIG. 5 is a perspective view showing the driven shaft assembly of an impact crusher.

As shown by cross-reference between FIGS. 3 and 5, shaft assembly 12 mounted on impact crusher 16, according to the present invention, includes a driven shaft 34. In the case of impact crusher 16, driven shaft 34 cooperates with other structural components to rotate impeller table 22.

As shown by cross-reference between FIGS. 3 and 5, shaft assembly 12 of an apparatus for increasing wear life of machine members 10 also includes one or more bearings 36a and 36b. Each of one or more bearings 36a,b is engagable substantially radially with driven shaft 34. Each one or more bearings 36a,b has an inner race 38a,b of roller bearings 40a,b substantially concentric to the center of gravity and logitudinal axis 42 of driven shaft 34. As used in conjunction with impact crusher 16, and as shown best in FIG. 3, a first one or more bearings 36a ("upper bearing") is located a distance 44 above one or more bearings 36b ("lower bearing"). Each of the one or more bearings 36a and 36b is engagable with driven shaft 34. However, in connection with impact crusher 16, one or more bearings 36a which is above one or more bearings 36b may be more tightly engaged with driven shaft 34 than one or more bearings 36b. Because use of impact crusher 16 may require the user to more tightly engage one or more of the one or more bearings 36a,b with driven shaft 34 than one or more other of the one or more bearings 36a,b, comparatively more friction, heat, and unbalanced forces occur in connection with the one or more bearings 36a,b which may be less tightly engaged with driven shaft 34 are generated during rotation of driven shaft 34 within lower bearing 36b. Further, radial loads on lower bearing 36b may be greater than on upper bearing 36a. During rotation of driven shaft 34, several forces and loads are applied to or generated by rotation of driven shaft 34 in lower bearing 36b because lower bearing 36b is more loosely engaged with driven shaft 34 than in upper bearing 36a.

Figure 4:
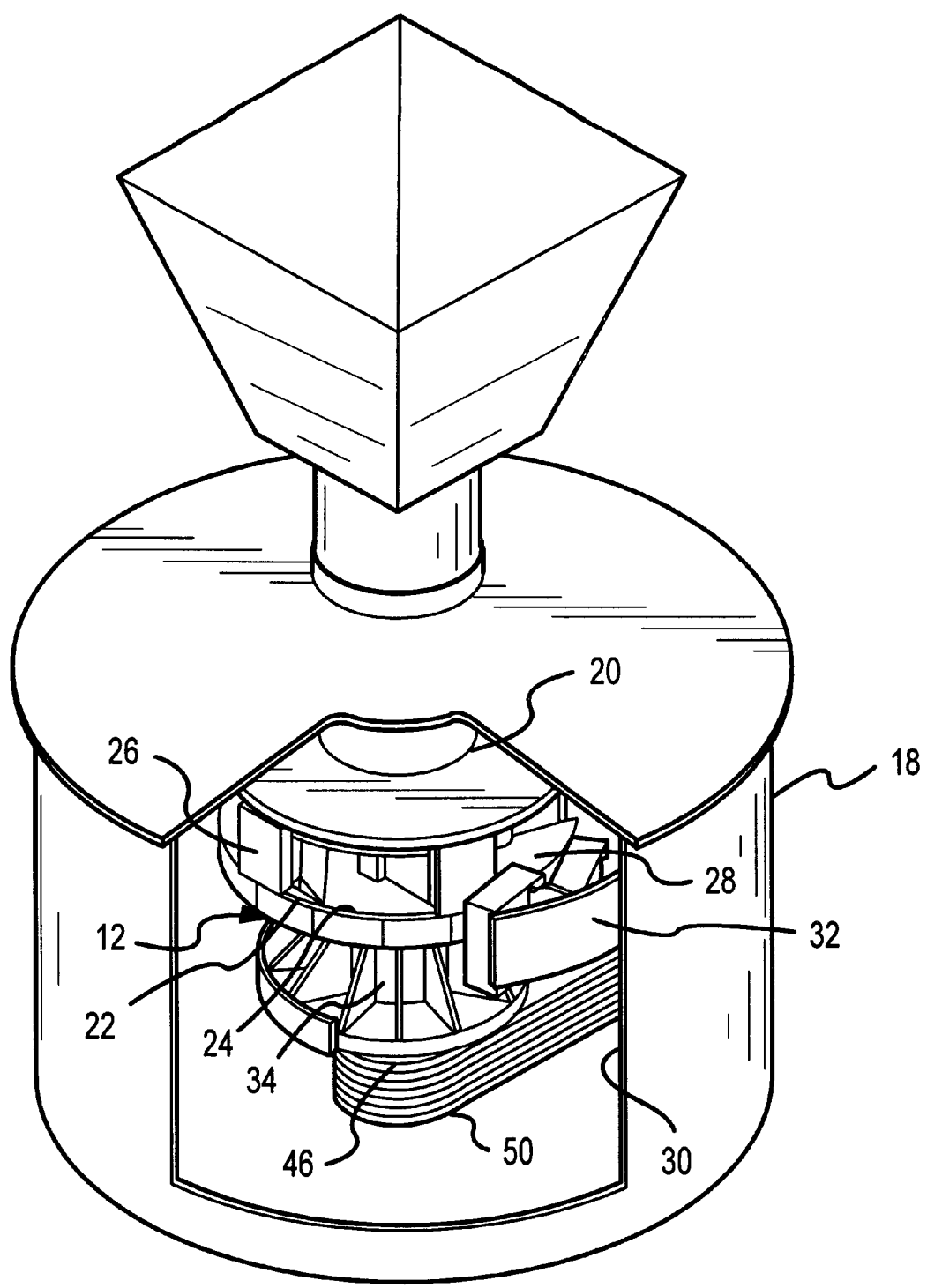
FIG. 4 is a partial cut-away perspective view of an impact crusher.

As shown by cross-reference between FIGS. 3 and 4, an apparatus for increasing the wear life of machine members 10, according to the present invention, also includes one or more pulleys 46 attached to driven shaft 34 of shaft assembly 12. One or more pulleys 46 are attached substantially concentrically to driven shaft 34. As shown in FIG. 3, one or more pulleys 46 may be formed with one or more grooves 48 for receiving one or more belts 50. As also shown in FIGS. 1 and 3, an apparatus for increasing wear life of machine members 10 also includes two or more power sources 52a,b having a drive shaft assembly 54a,b. In the embodiment of the present invention associated with impact crusher 16, power sources 52a,b are engines 56a,b. As will be obvious to one skilled in the art, engines 56a,b may be fueled or powered by electricity, gasoline, diesel or similar fuels. Each of the one or more engines 56a,b is equipped with drive shaft assembly 54a,b having a drive shaft 58a,b.

An apparatus for increasing wear life of machine members 10 includes a unique and novel arrangement of driven shaft 34 in relationship to drive shafts 58a,b of each of two or more engines 56a,b. As best shown in FIG. 1, the two or more engines 56a,b are aligned eccentrically to driven shaft 34 of shaft assembly 12. The term "eccentrically" means that the axis or rotation 60 of driven shaft 34, as shown by cross-reference between FIGS. 1 and 3, and the axes of turning 62a,b of drive shaft 58a,b on two or more engines 56a,b, are not aligned substantially in a straight line. Thus, the present invention aligns two or more engines 56a,b with relation to axis of rotation 60 of driven shaft 34 of shaft assembly 12 to form an acute angle 64 between axis of rotation 60 of driven shaft 34, and longitudinal axes 42a,b of each of drive shaft 58a,b of two or more engines 56a,b. The arrangement of two or more engines 56a,b and of driven shaft 34 to form an acute angle 64, and a relational triangle having a first apex 66 at the center of axis of rotation 60 of driven shaft 34, and center of axes of turning 62a,b of two or more engines 56a,b as the second apex 68 and third apex 70 respectively of the triangle, substantially reduces the forces and loads which cause wear to machine members including one or more bearings 36a,b in which driven shaft 34 is located. Aligning two or more engines 56a,b eccentrically to driven shaft 34 of machine 14 materially increases sustainable radial loads and other forces that one or more bearings 36 in association with driven shaft 34 will sustain. Eccentric alignment of two or more engines 56a,b also minimizes vibrations caused in driven shaft 34 which would be transmitted to one or more bearings 36a,b when two or more engines 56a,b are located in conventional alignment substantially opposite one another with driven shaft 34 positioned substantially between two or more engines 56a,b, and reduces unbalanced harmonics in machine members of machine 14. In addition, eccentric alignment of two or more engines 56a,b also allows machine 14 to be driven at higher speeds, sustaining higher loads. Acute angle 64 is found to be optimum is between 17 degrees and 69 degrees at first apex 66. In addition to applying power evenly on machine members of machine 14, the configuration of the present invention permits substantially increased torque to be applied to machine members of machine 14 during operation of machine 14. Further, the configuration of the present invention modulates or dampens vibrations as well as induced oscillations on driven shaft 34, and consequently increases significantly the life of one or more bearings 36, and one or more inner races 38 of roller bearings 40.

As further shown in FIG. 3, an apparatus for increasing wear life of machine members 10 also includes one or more drums 72 attached substantially concentrically to each drive shaft 58a,b of two or more engines 56a,b. Drums 72 are formed with channels 74 to enable one or more belts 50 to be drivingly connectable to drum 72 and to one or more pulleys 46.

While the apparatus for increasing wear life of machine members shown and disclosed in detail in this instrument is fully capable of obtaining the objects, and providing the advantages stated, this disclosure is merely illustrative of the presently preferred embodiments of the invention, and no limitations are intended in connection with the details of construction, design or composition other than as provided and described in the appended claims.

What is claimed is:

1. An apparatus for increasing wear life of machine members of an impact aggregate crusher, comprising:
   a shaft assembly including a driveable rotatable shaft;
   a first power source, the first power source further including a first driving shaft;
   a second power source, the second power source including a second driving shaft;
   means for positioning the axis of rotation of the driveable rotatable shaft to form an acute angle between a first plane through the axis of rotation of the driveable rotatable shaft and the axis of rotation of the first driving shaft, and a second plane through the axis of rotation of the driveable rotatable shaft and the axis of rotation of the second driving shaft; and
   means drivingly connectable to the shaft assembly, to the first driving shaft, and to the second driving shaft for rotating the driveable rotatable shaft.

2. An apparatus for increasing wear life of machine members of an impact aggregate crusher as recited in claim 1, wherein the shaft assembly includes one or more bearings mounted substantially radially on the driveable rotatable shaft.

3. An apparatus for increasing wear life of machine members of an impact aggregate crusher as recited in claim 2, wherein the machine members includes a pulley mounted on driveable rotatable shaft.

4. An apparatus for increasing wear life of machine members of an impact aggregate crusher as recited in claim 3, wherein the first power source and the second power source are engines.

5. An apparatus for increasing wear life of machine members of an impact aggregate crusher as recited in claim 4, wherein the first power source and the second power source includes one or more drums attached substantially concentrically to the first driving shaft and to the second driving shaft.

6. An apparatus for increasing wear life of machine members of an impact aggregate crusher as recited in claim 5, wherein the rotating means is one or more belts.

7. An apparatus for increasing wear life of machine members of an impact aggregate crusher, comprising:
   a driven shaft mounted on said machine members, the driven shaft having one or more bearings engageable substantially radially with the driven shaft;
   one or more pulleys attached substantially concentrically to the driven shaft;
   a first power source, the first power source further including a first drive shaft;
   a second power source the second power source including a second drive shaft;
   means for positioning the axis of rotation of the driven shaft to form an acute angle between a first plane through the axis of rotation of the driven shaft and the axis of rotation of the first drive shaft, and a second plane through the axis of rotation of the driven shaft and the axis of rotation of the second drive shaft; and
   one or more drums attached substantially concentrically to each of said drive shafts; and
   two or more belts drivingly connectable to the one or more pulleys and to the one or more drums for rotating the driven shaft.

8. An apparatus for increasing wear life of machine members of an impact aggregate crusher as recited in claim 7, wherein the axis of rotation of the driven shaft is aligned substantially parallel to the longitudinal axis of the first drive shaft and the second drive shaft.

9. An apparatus for increasing wear life of machine members of an impact aggregate crusher as recited in claim 7, wherein the one or more bearings is slidably engageable with the driven shaft.

10. A process for manufacturing an apparatus for increasing wear life of machine members of an impact aggregate crusher, comprising the steps of:
    providing a shaft assembly, wherein the shaft assembly further includes a driveable rotatable shaft mounted on said machine members;
    connecting one or more pulleys to the shaft assembly;
    selecting a first power source having a first drive shaft;
    selecting a second power source having a second drive shaft;

mounting one or more drums on each of the drive shafts;

positioning the axis of rotation of the driveable rotatable shaft to form an acute angle between a first plane through the axis of rotation of the driveable rotatable shaft and the axis of rotation of the first drive shaft, and a second plane through the axis of rotation of the driveable rotatable shaft and the axis of rotation of the second drive shaft; and installing two or more belts drivingly connectable to said one or more pulleys and said one or more drums for rotating said driven shaft.

11. A process for manufacturing an apparatus for increasing wear life in members of an impact aggregate crusher as recited in claim 10, wherein the shaft assembly includes one or more bearings engageable substantially radially with the driveable rotatable shaft.

12. A process for manufacturing an apparatus for increasing wear life in members of an impact aggregate crusher as recited in claim 10, wherein the shaft assembly includes one or more pulleys attached substantially concentrically to said driveable rotatable shaft.

13. A process for manufacturing an apparatus for increasing wear life in members of an impact aggregate crusher as recited in claim 10, wherein the first power source and the second power source is an engine.

* * * * *